(12) United States Patent
Marwah et al.

(10) Patent No.: US 9,081,880 B2
(45) Date of Patent: *Jul. 14, 2015

(54) DETERMINING SUSTAINABILITY OF A DATA CENTER

(71) Applicant: Hewlett-Packard Development Company, L. P., Houston, TX (US)

(72) Inventors: Manish Marwah, Palo Alto, CA (US); Amip J Shah, Santa Clara, CA (US); Ratnesh Kumar Sharma, Fremont, CA (US); Thomas W Christian, Fort Collins, CO (US); Paulo Maciel, Recife (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/850,162

(22) Filed: Mar. 25, 2013

(65) Prior Publication Data
US 2013/0226525 A1 Aug. 29, 2013

Related U.S. Application Data

(63) Continuation of application No. 12/560,278, filed on Sep. 15, 2009, now Pat. No. 8,447,569.

(51) Int. Cl.
G06F 11/30 (2006.01)
G06F 11/34 (2006.01)
G06F 11/00 (2006.01)

(52) U.S. Cl.
CPC .......... *G06F 11/3409* (2013.01); *G06F 11/008* (2013.01); *G06F 11/3006* (2013.01); *G06F 11/3058* (2013.01)

(58) Field of Classification Search
CPC ...... G06F 11/008; G06Q 50/06; G06Q 10/00; G06Q 10/0639; G06Q 40/04; G05D 23/1917
USPC .......... 702/179, 186, 189; 709/224, 226, 238; 710/17; 714/100
See application file for complete search history.

(56) References Cited

U.S. PATENT DOCUMENTS

| | | | |
|---|---|---|---|
| 7,426,554 B2 | 9/2008 | Kennedy | |
| 8,447,569 B1 * | 5/2013 | Marwah et al. | ............... 702/186 |
| 2009/0228242 A1 | 9/2009 | Nassar | |
| 2010/0274629 A1 | 10/2010 | Walker et al. | |
| 2010/0332373 A1 | 12/2010 | Crabtree et al. | |
| 2012/0004938 A1 | 1/2012 | Beaver | |

* cited by examiner

*Primary Examiner* — Elias Desta
(74) *Attorney, Agent, or Firm* — Wagner Blecher, LLP (57) ABSTRACT

Determining a sustainability impact for available data center architectures. A data center is accessed by a computer. Two or more functional parameters of the data center are then evaluated by the computer. Then, the computer combines the two or more evaluated functional parameters into a quantified judgment to determine a sustainability impact of available architectures of the data center.

16 Claims, 5 Drawing Sheets

DETERMINING SUSTAINABILITY OF A DATA CENTER

CROSS-REFERENCE TO RELATED APPLICATIONS

This application is a continuation of U.S. patent application Ser. No. 12/560,278, now U.S. Pat. No. 8,447,569, entitled "Determining Sustainability of a Data Center Field", filed on Sep. 15, 2009, and assigned to the assignee of the present application.

BACKGROUND

In recent years, there has been a significant growth in the number, size and power density of data centers. This has been fueled by paradigms such as software as a service, cloud computing, and a whole gamut of Internet-based businesses, social networking sites and multimedia applications and services.

Due to the increased dependence on Internet services, data center availability is assuming greater significance. For companies that depend heavily on the Internet for their operations, such as on-line financial services, service outages can be very expensive, easily running into millions of dollars per hour. A widely used design principle in fault-tolerance is to introduce redundancy to enhance availability (the percentage of time that a system provides service at or above the expected and/or required level). This allows use of inexpensive commodity components—having low availability individually—to provide high availability as an aggregate.

This principle is widely practiced in the industry by companies that use commodity hardware and redundant architectures with software control to mask failures and increase availability. However, since redundancy leads to additional use of materials and energy, it is expected to have a negative impact on sustainability.

BRIEF DESCRIPTION OF THE DRAWINGS

The accompanying drawings, which are incorporated in and form a part of this specification, illustrate embodiments of the present technology for determining a sustainability impact for available data center architectures with different availabilities, together with the description, serve to explain principles discussed below.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "accessing", "evaluating", "combining", "adjusting", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers. It should be appreciated that in one embodiment, the present technology may be hardware and firmware, while in another embodiment, the present technology may be hardware and software.

Overview

At present, data center designers have very little information for quantitative evaluation of the sustainability impact of available architectures comprising a data center. In fact, two different data center architectures with similar availability numbers may have very different sustainability impact valuations.

In the context of embodiments of the present technology, the term "sustainability impact" refers to a quantified valuation of the environmental impact of implementing various combinations of available architectures. The term "available architectures" refers to the available combinations of components that may be placed within a data center, while considering the percentage of time that an architecture having these available combinations of components provides service at or above the expected and/or required level. Additionally, the total cost of ownership for these various available architectures may be computed and considered in combination with the quantified sustainability impact in enabling architectural design choices.

Embodiments in accordance with the present technology pertain to a quantification hardware module for determining a sustainability impact for architectures available to be placed within a data center. In general, embodiments quantify the sustainability impact of design choices by making comparisons between different available architectures; these comparisons are then integrated with data center sustainability impact valuations to provide a quantified judgment that enables data center designers to make architecture choices. In some instances, total cost of ownership valuations are integrated with the comparisons and the data center sustainability impact valuations to provide the quantified judgment.

More particularly and in brief, embodiments of the present technology access a data center. The data center may be accessed during its design, during its operation, and/or at its end-of-life. Functional parameters of the data center are then evaluated. These functional parameters may include the availability of different combinations of components that may be placed in a data center (available architectures), and the impact these available combinations of components have on the environment in terms of "sustainability", as well as the total cost of ownership of each combination of available components.

Next, the evaluated functional parameters of the data center may be combined to generate a quantified judgment. The quantified judgment comprises sustainability impact valuations of available architectures of the data center. In another embodiment, the quantified judgment comprises total cost of ownership valuations. In one embodiment, the data center may be adjusted based on the quantified judgment. Thus, embodiments of the present technology determine a sustainability impact for available data center architectures, thus enabling the adjustment of the data center based on the valuations of the sustainability impact.

Example Architecture of a Quantification Hardware Module

Figure 1:
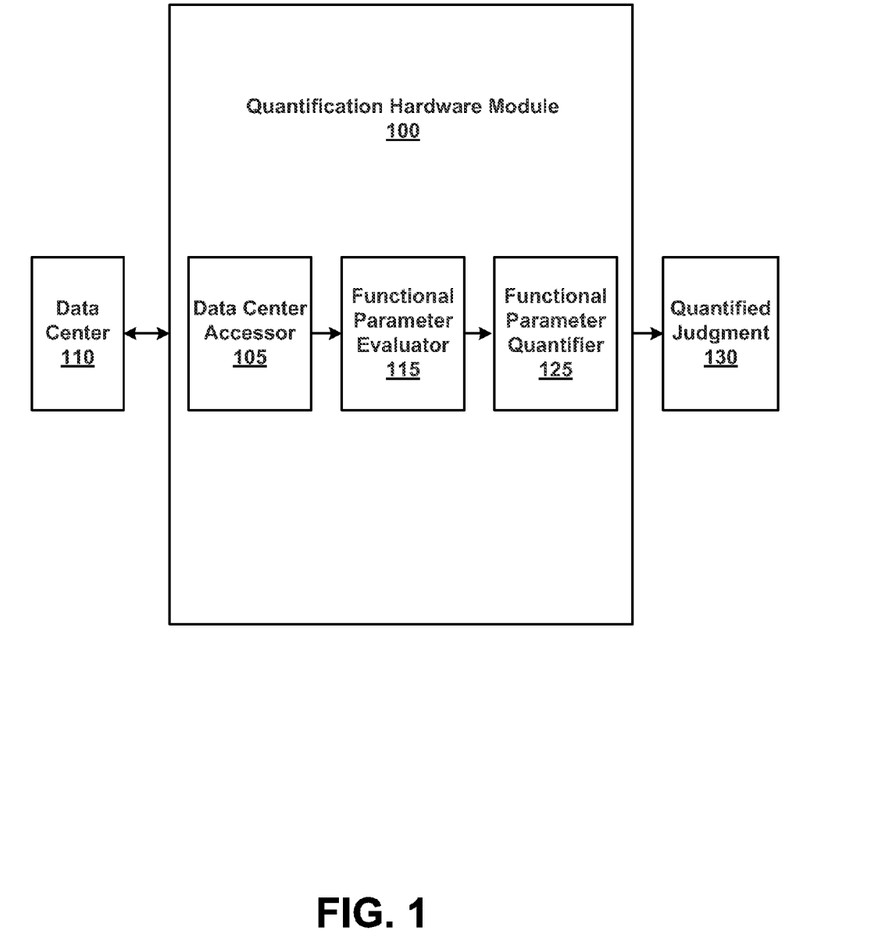
FIG. 1 is a block diagram of an example quantification hardware module, in accordance with embodiments of the present technology.

FIG. 1 is a block diagram of an example quantification hardware module (QHM) 100, in accordance with embodiments of the present technology. QHM 100 includes a data center accessor 105, a functional parameter evaluator 115 and a functional parameter quantifier 125.

Figure 2:
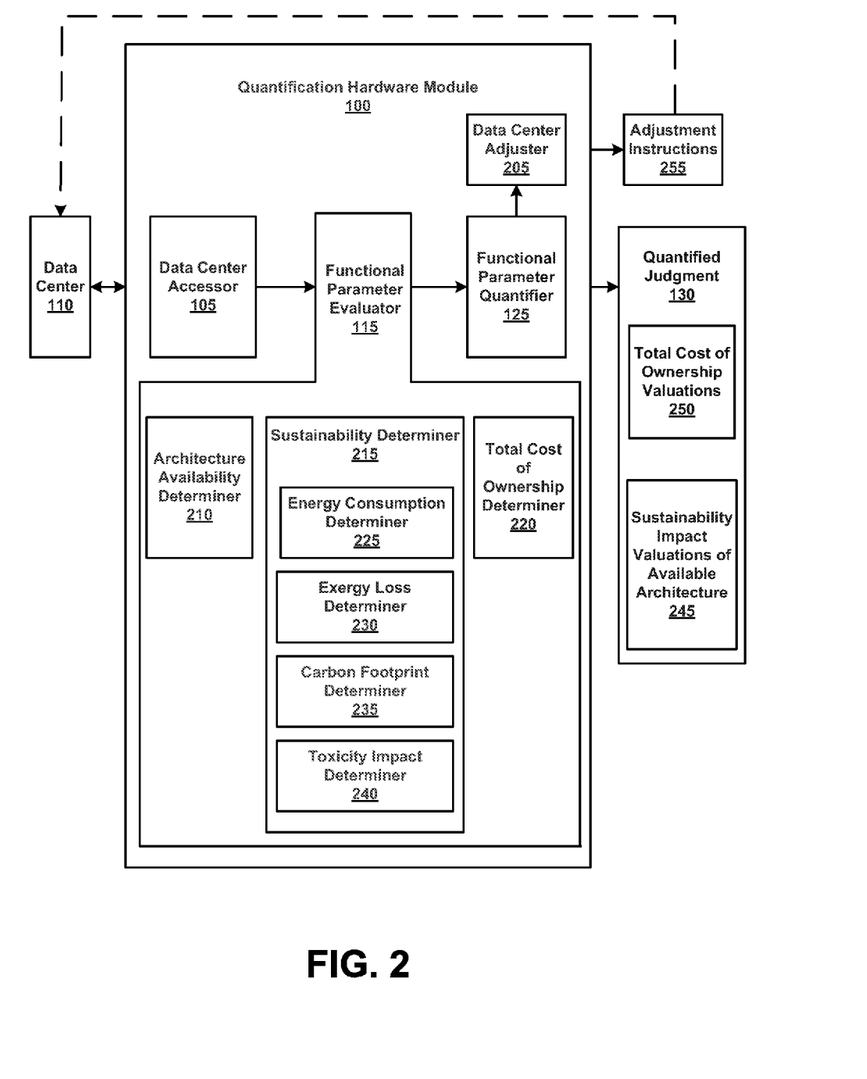
FIG. 2 is a block diagram of an example quantification hardware module, in accordance with embodiments of the present technology.

Referring to FIG. 2, a block diagram of an example QHM 100 is shown, in accordance with embodiments of the present technology. In further embodiments, QHM 100 includes data center adjuster 205. In further embodiments, the functional parameter evaluator 115 includes architecture availability determiner 210 and sustainability determiner 215. In addition to architecture availability determiner 210 and sustainability determiner 215, functional parameter evaluator 115 may also include total cost of ownership determiner 220. Further, functional parameter evaluator 115 may also include other metric determiners other than total cost of ownership determiner 220 and in addition to availability determiner 210 and sustainability determiner 215.

In embodiments, sustainability determiner 215 may be one or more of but not limited to, the following metric determiners: energy consumption determiner 225, energy loss determiner 230, carbon footprint determiner 235 and toxicity impact determiner 240. In general, sustainability determiner 215 determines metrics associated with the impact of each possible architecture, as determined by architecture availability determiner 210, on the environment.

FIGS. 1 and 2 show data center accessor 105 accessing data center 110. FIGS. 1 and 2 also show functional parameter quantifier 125 generating a quantified judgment 130 that in one embodiment includes a sustainability impact determination of available architectures 245, in another embodiment, quantified judgment 130 includes a total cost of ownership valuation 250.

Example Operation of a Quantification Hardware Module

More generally, in embodiments in accordance with the present technology, QHM 100 is utilized to generate a quantified judgment 130, including sustainability impact valuations of available architectures 245. The quantified judgment 130 may take into account various environmental and cost factors relating to the available architectural design choices of data center 110.

For example, the sustainability values and the total cost of ownership values for each available architecture may be considered. Based on pre-determined policy objectives, the quantified judgment 130 may recommend and/or require certain data center design or operational changes to be made based upon the comparison of the sustainability values and the total cost of ownership values for available architectures. As a result, embodiments of the present technology enable the adjustment in a data center's design based upon the quantified judgment 130 to achieve a data center that meets policy objectives.

More particularly, and referring to FIG. 1, in one embodiment, a data center accessor 105 accesses data center 110. By accessing data center 110, data center accessor 105 accesses the data center's infrastructure and parts thereof. For example, a data center may include, but is not limited to, three sub-systems: (1) IT infrastructure; (2) power infrastructure; and (3) cooling infrastructure. In one embodiment, data center accessor 105 may access any or all parts of these three sub-systems.

Furthermore, in one embodiment, data center accessor 105 accesses data center 110 during the design of data center 110. In another embodiment, data center accessor 105 accesses data center 110 during the operation of data center 110. In yet another embodiment, data center accessor 105 accesses data center 110 at the end-of-life of data center 110.

Referring still to FIG. 1, in one embodiment, functional parameter evaluator 115 evaluates functional parameters of data center 110. These functional parameters may include the availability of different combinations of components that may be placed in a data center 110, and the impact these available combinations of components have on the environment in terms of "sustainability", as well as the total cost of ownership of each combination of available components. In one embodiment and as described herein, with reference to FIG. 2, the functional parameter evaluator 115 includes availability determiner 210 and sustainability determiner 215. In further embodiments, the functional parameter evaluator 115 may also include total cost of ownership determiner 220.

In embodiments of the present technology, many techniques may be used to determine the availability of different combinations of components that may be arranged in a data center 110. For example, but not limited to, the following techniques may be used: stochastic petri nets, reliability block diagrams, zone branch, event tree, monte carlo and discrete event simulation, cut set, path set, fault tree, and markov model. Of note, multiple techniques may be used to determine the availability of different combinations of components that may be arranged in a data center 110. For example, initially, stochastic petri nets may be used to analyze a first combination of components associated with a data center 110, while a different technique, such as reliability block diagram may be used to analyze a second combination of components associated with the data center 110. Thus, any number of techniques may be used to analyze any number of combinations of components.

It should be understood that there are many techniques for determining the availability of components within a data center which are well known in the art. Further, the general method of applying the techniques of stochastic petri nets, reliability block diagrams, zone branch, event tree, monte carlo and discrete event simulation, cut set, path set, fault tree, and markov model is also well known in the art. Application of the technique of stochastic petri nets, in an example implementation of an embodiment of the present technology, is described below.

Sustainability determiner 215 determines sustainability aspects of the various combinations of available components within data center 110. For example, in one embodiment, sustainability determiner 215 includes an energy consumption determiner 225. Energy consumption determiner 225 measures the energy used by the various combinations of available components within data center 110.

In another embodiment, sustainability determiner 215 includes energy loss determiner 215. Energy loss determiner 215 measures the energy loss associated with the various combinations of available components with data center 110. Application of the energy loss determiner 230, in an example implementation of an embodiment of the present technology, is described below. However, it should be understood that the application of the energy loss determiner 230 is not limited to this example.

In another embodiment, sustainability determiner 215 includes carbon footprint determiner 235. Carbon footprint determiner 215 measures the carbon footprint associated with the various combinations of available components with data center 110. In yet another embodiment, sustainability determiner 215 includes toxicity impact determiner 235. Toxicity impact determiner 215 measures the toxicity impact associated with the various combinations of available components with data center 110.

It should be understood that the sustainability determiner 215 may include more, less, and/or different determiners than the following impact determiners that quantify the impact of the various available combinations of components on the environment: energy consumption determiner 225, energy loss determiner 230, carbon footprint determiner 235, and toxicity impact determiner 240. Additionally, in some embodiments, the sustainability determiner 215 may consist of a mathematical combination of, but not limited to, one or more of the following impact determiners: energy consumption determiner 225; energy loss determiner 230; carbon footprint determiner 235; and toxicity impact determiner 240.

In one embodiment, the mathematical combination may involve simple operational functions, such as addition, subtraction, multiplication or division of different impacts. In another embodiment, the mathematical combination may include numerical values in the form of "weights" for different determiners. In yet another embodiment, the mathematical combination may include more complicated functional forms, such as but not limited to exponential, polynomial and/or other types of mathematical functions.

Total cost of ownership determiner 220 determines the total cost of ownership of one or more combinations of accessed combinations of available components within data center 110. In yet another embodiment, the total cost of operation of one or more combinations of accessed combinations of available components within data center 110 may be determined. In one embodiment, and as will be described in an example implementation of an embodiment of the present technology, the total cost of ownership may be based on a retail price of components and cost of operations as a fraction of total data center costs over a period of time. However, it should be understood that the computation of the total cost of ownership is not limited to this example.

In one embodiment, the functional parameter quantifier 125 combines the functional parameters evaluated by functional parameter evaluator 115 into a quantified judgment 130. In embodiments of the present technology, the quantified judgment 130 accounts for the quantified availability of various combinations of components within data center 110 and the quantified sustainability (sustainability impact) of these various available combinations of components. Additionally, the quantified judgment 130 may account for the quantified total cost of ownership of these various available combinations of components.

The quantified judgment 130, in one embodiment, includes sustainability impact valuations of available architectures 245. An example implementation of the functional parameter quantifier 125 will be described below, according to embodiments of the present technology. The sustainability impact valuations of available architectures 245 is the quantified environmental impact of various available combinations of components within data center 110.

In one embodiment, the quantified judgment 130 may include a single metric, such as just the sustainability impact valuations of available architectures 245. In another embodiment, the quantified judgment 130 may include multiple metrics, such as a mathematical combination of the sustainability impact valuations of available architectures 245 and the total cost of ownership valuations 250. In yet another embodiment, the quantified judgment 130 may include multiple metrics such as a mathematical combination of the architecture availability, the architecture sustainability, and the total cost of ownership.

In one example but not limited as such, one method of combining one or more properties of the architecture such as availability and sustainability would be to consider utility functions where each of these properties is mapped to a utility of 0 to 1. An objective function composed of a weighted sum of the utilities is created. The weights may be assigned by a data center architect/designer. The optimal design will result from a maximization of this objective function.

In one embodiment, data center adjuster 205 adjusts the design of the data center 110 according to the quantified judgment 130. In one embodiment, the data center 110 design is adjusted automatically according to a pre-determined policy. For example, a company may have a policy of not allowing the total cost of ownership to reach a level X. Once, the total cost of ownership reaches the level X, the data center adjuster 205 indicates that the architecture of the data center 110 should be modified to achieve lower total cost of ownership. In one embodiment, this modification to achieve lower cost of ownership may comprise downsizing to achieve architecture with fewer components. In another embodiment, while the architecture may support the same number of components, other factors may be adjusted to achieve a lower total cost of ownership.

In another embodiment, the data center adjuster 205 adjusts the data center 110 according to received adjustment instructions 255. For example, a user may view the quantified judgment 130 and the sustainability impact valuations of available architectures 245 on a display device (see 518 of FIG. 5). The user may then employ an I/O device (see 520 of FIG. 5) to instruct the data center adjuster 205 to adjust the design of the data center 110 to stop utilizing a particular redundant component due to its high energy loss value. Of note, embodiments of the present technology enable a more usable study of the relationships between the functional parameters. The resulting analysis can be used in the design of future data centers, and the adjustment of existing data centers.

Figure 3:
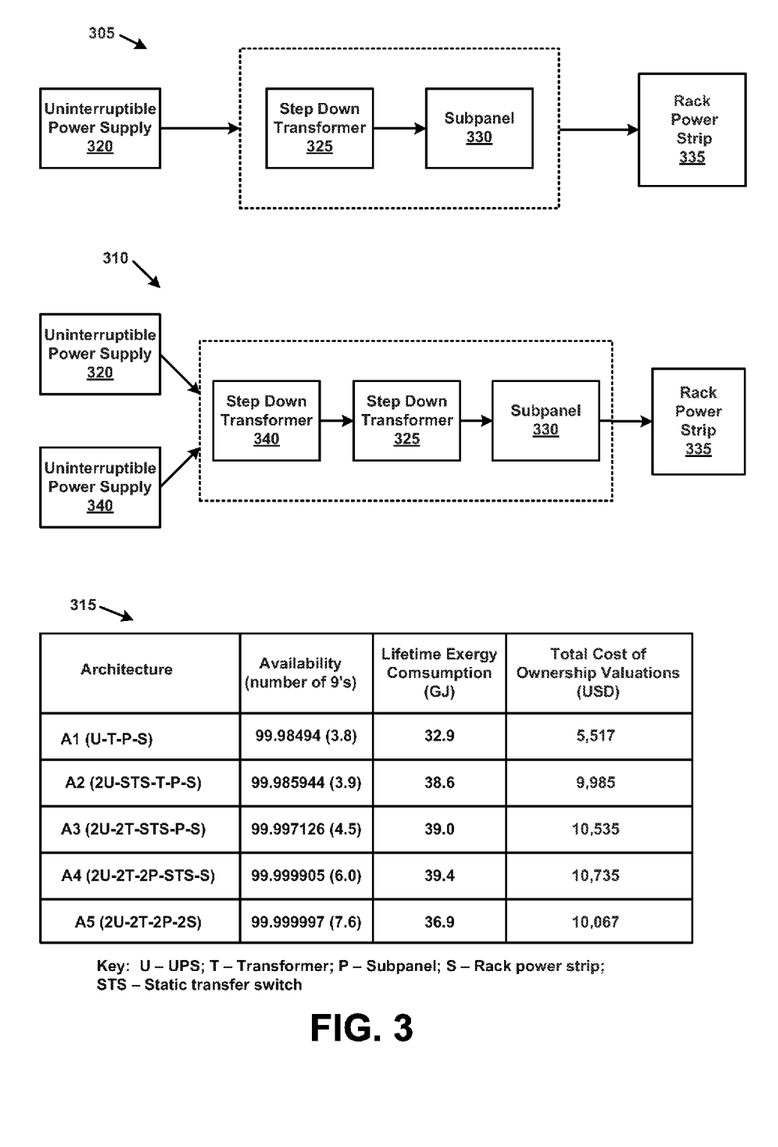
FIG. 3 is a series of three block diagrams to explain an example implementation of an example quantification hardware module, in accordance with embodiments of the present technology.

Referring now to FIG. 3, one implementation of the present technology that is in no way exclusive of other implementations is shown. FIG. 3 is a series of three block diagrams, a baseline power delivery architecture (A1) 305, an architecture with redundant uninterruptible power supply and static transfer switch (A2) 310, and a summary of results corresponding to availability, sustainability metrics and total cost of ownership for five architectures 315 that explain an example implementation of an example QHM 100, in accordance with embodiments of the present technology.

In general and as described herein, the infrastructure of a data center 110 may comprise, but is not limited to, three sub-systems that are well known in the art: (1) IT infrastructure, (2) power infrastructure, and (3) cooling infrastructure. Additionally and as well known in the art, a typical instantiation of the power infrastructure includes: an uninterruptible power supply (UPS), a step-down transformer, an electrical subpanel, and a rack power strip.

To enhance availability, one or more of these components can be duplicated. The example application of a QHM 100 considers five power infrastructure architectures with increasing redundancy, where in each successive architecture an additional component is duplicated. For each architecture, the following is quantified: (1) availability using stochastic petri nets (SPN); (2) lifetime energy loss; and (3) total cost of ownership.

Referring now to 305 of FIG. 3, a baseline power delivery architecture (A1) is shown. Baseline power delivery architecture (A1) 305 comprises one UPS 320, one step down transformer 325, one subpanel 330, one rack power strip 335. Of note, baseline power delivery architecture (A1) 305 shows no redundant components.

Referring now to 310 of FIG. 3, a power delivery architecture (A2) with redundant UPS is shown in accordance with embodiments of the present technology. Power delivery architecture (A2) 310 comprises two UPSs (UPS 320 and UPS 340), one step down transformer 325, one subpanel 330, and one rack power strip 335. Additionally, power delivery architecture (A2) 310 comprises a static transfer switch 340 so that either UPS 320 or UPS 340 can connect to the step down transformer 325.

Similarly, architectures A3, A4 and A5 are considered, where the step down transformer 325, the subpanel 330 and the rack power strip 335 are also duplicated, respectively. Referring now to 315 of FIG. 3, a summary of results corresponding to architecture availability, sustainability metric and total cost of ownership for the architectures A1, A2, A3, A4 and A5 is shown in accordance with embodiments of the present technology.

As seen in 315 of FIG. 3, architecture A3 comprises two UPSs, two transformers, one static transfer switch, one subpanel and one rack power strip. Architecture A4 comprises two UPSs, two transformers, one static transfer switch, two subpanels and one rack power strip. Architecture A5 comprises two UPSs, two transformers, two subpanels, and two rack power strips. Of note, given the components of architecture A5, the static transfer switch is no longer required, and is thus not shown.

The metric utilized to determine sustainability is lifetime energy consumption, measured in joules. The lifetime energy consumption metric quantifies the total available energy consumed by the power delivery infrastructure across its lifespan (including during extraction of raw materials, processing and manufacturing, to operation and end-of-life). Of note, it can also be converted into a kg-CO2 equivalent to determine its carbon footprint. Referring now to 315 of FIG. 3, the lifetime energy consumption shows a generally increasing trend as more hardware is added to the power delivery infrastructure. There is a marked increase (~18%) from architecture A1 to architecture A2 since a UPS and an STS are added. From architecture A2 to architecture A4, 315 of FIG. 3 shows only a few percent increase. However, from architecture A4 to architecture A5, it decreases since the static transfer switch used in architecture A4 is no longer needed and present.

Also shown in 315 of FIG. 3 are estimates of the approximate total cost of ownership (TCO) for the five architectures, A1, A2, A3, A4 and A5. As already stated herein, these are based on the retail price of the components and cost of operations as a fraction of total data center costs over a period of five years. These may be computed as a point of comparison to see if a cost effective design is also more sustainable. A big jump in cost is shown from architecture A1 to architecture A2. This jump reflects the high cost of the UPS (shown to be redundant in architecture A2) as compared to the other components. The changes in lifetime energy are primarily due to additional hardware, since the operational power consumption between architectures does not change much.

In sum, FIG. 315 of FIG. 3 shows that as availability increases significantly from architecture A2 to architecture A3 (~15%) and then from architecture A3 to architecture A4 (~33%), the sustainability valuation increase is negligible. Thus, minimizing redundancy may not always lead to optimal sustainability. The sustainability valuation decreases from architecture A4 to architecture A5; this is because the static transfer switch is not required in architecture A5. Note that redundancy increases from architecture A4 to architecture A5.

Referring still to 315 of FIG. 3, it can be seen that although both the TCO and sustainability increase slightly from architecture A2 to architecture A4, they do not always change together. While architecture A2 has a slightly lower cost, architecture A5 has lower lifetime energy consumption. Thus, optimizing based on TCO will not necessarily lead to optimal sustainability.

The importance of sustainability necessitates its consideration in design and operation of highly available data centers. However, none of the existing metrics used by data center designers is a true indicator of sustainability. The TCO or the amount of redundancy used in a data center does not always correlate to sustainability. Embodiments of the present technology provide a method of determining a sustainability impact for data center architectures with varying levels of redundancy and availability that enable data center designers to make better architecture choices.

Figure 4:
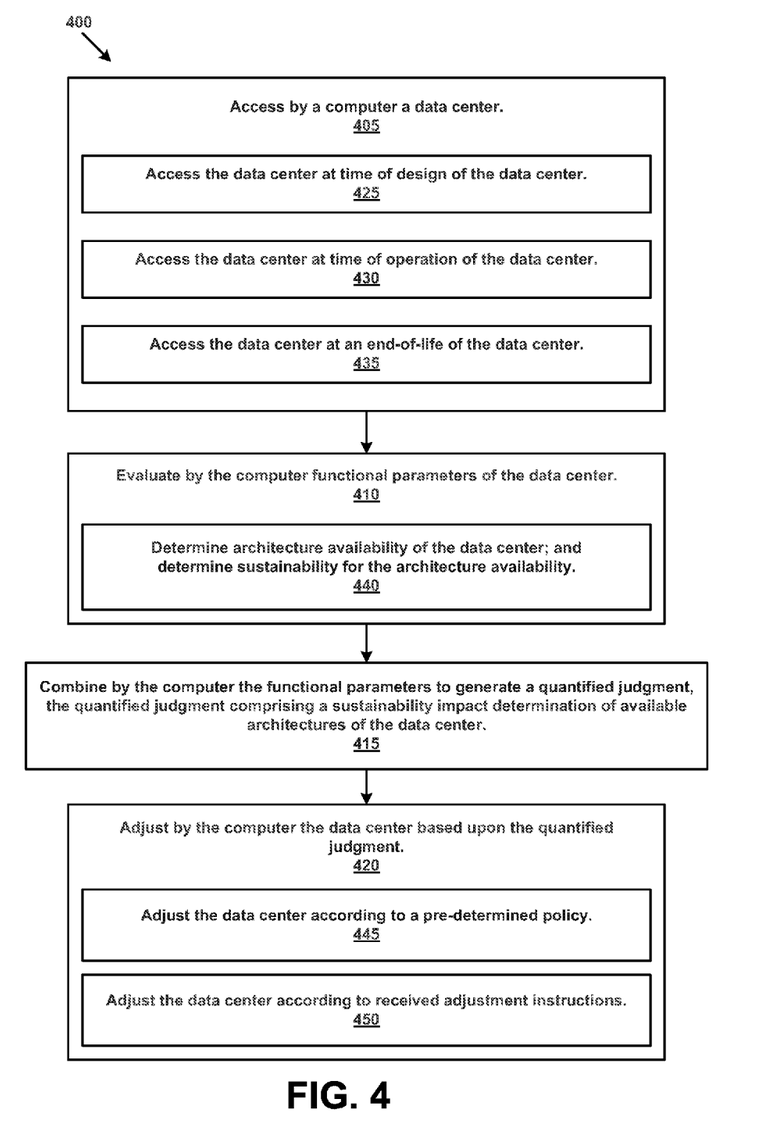
FIG. 4 is a flowchart of an example method for determining a sustainability impact for available data center architectures, in accordance with embodiments of the present technology.

FIG. 4 is a flowchart of an example method for determining a sustainability impact for available data center architectures, in accordance with embodiments of the present technology. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 400 is performed by QHM 100 of FIG. 1.

Referring to 405 of FIG. 4, in one embodiment and as described herein, the QHM 100 accesses by a computer a data center 100. In one embodiment and as described herein and referring to 425 of FIG. 4, the data center 110 is accessed at the time of design of the data center 110. Referring to 430 of FIG. 4, in another embodiment and as describe herein, the data center 110 is accessed at the time of operation of the data center 110. Referring now to 435 of FIG. 4, in one embodiment and as described herein, the data center 110 is accessed at the end-of-life of the data center 110.

Referring now to 410 of FIG. 4, in one embodiment and as described herein, the QHM 100 evaluates by a computer functional parameters of the data center 110. Referring now to 440 of FIG. 4, in one embodiment and as described herein, the evaluating by a computer functional parameters of the data center 110 comprises determining architecture availability for the data center 110 and determining sustainability for the determined architecture availability.

Referring now to 415 of FIG. 4, in one embodiment and as described herein, the QHM 100 of FIG. 1 combines by a computer the functional parameters to generate a quantified judgment 130, the quantified judgment 130 comprising a sustainability impact determination of available architectures 245 of the data center 110.

Referring now to 420 of FIG. 4, in one embodiment and as described herein, the QHM of FIG. 1 adjusts by a computer the data center 110 based upon the quantified judgment 130. Referring now to 445 of FIG. 4, in one embodiment and as described herein, the adjusting 420 by a computer the data center 110 based upon the quantified judgment 130 includes adjusting the data center 110 according to a pre-determined policy. Referring now to 450 of FIG. 4, in one embodiment and as described herein, the adjusting 420 by a computer the data center 110 based upon the quantified judgment 130 includes adjusting the data center 110 according to received adjustment instructions 255.

Thus, embodiments of the present technology enable a method for performing more stable and accurate data clustering.

Example Computer System Environment

Figure 5:
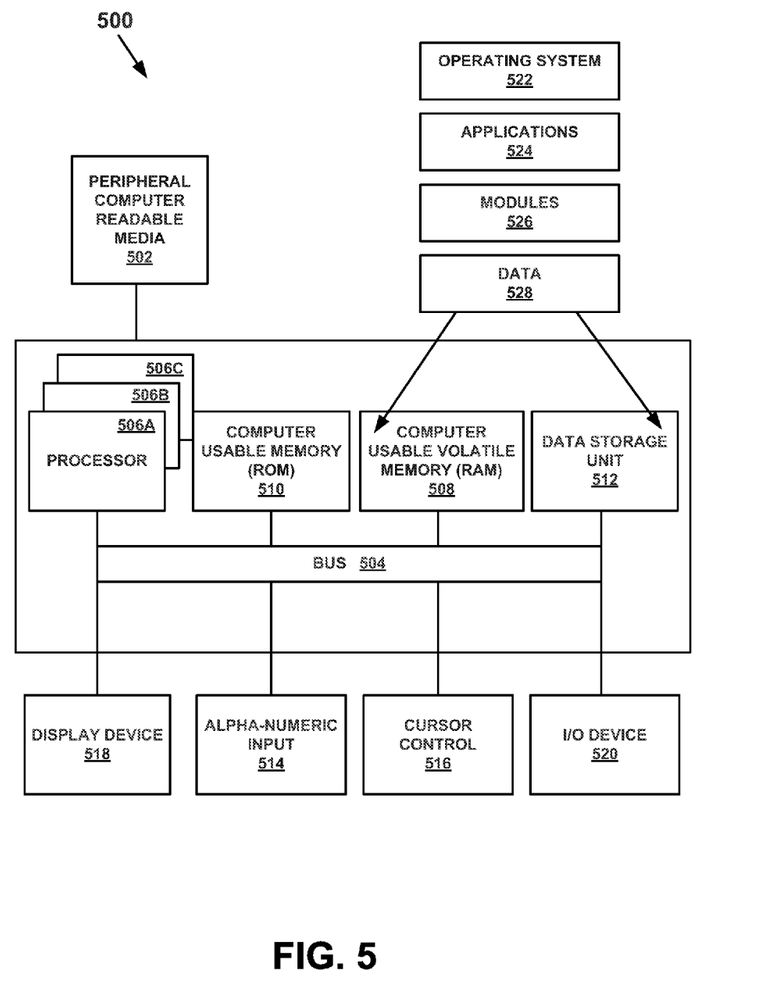
FIG. 5 is a diagram of an example computer system enabling determining a sustainability impact for available data center architectures, in accordance with embodiments of the present technology.

FIG. 5 illustrates an example computer system 500 used in accordance with embodiments of the present technology. It is appreciated that system 500 of FIG. 5 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 5, computer system 500 of FIG. 5 is well adapted to having peripheral computer readable media 502 such as, for example, a compact disc, and the like coupled therewith.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present invention, for example, is stored as an application 524 or module 526 in memory locations within RAM 508 and memory areas within data storage unit 512.

Computing system 500 is only one example of a suitable computing environment and is not intended to suggest any limitation as to the scope of use or functionality of embodiments of the present technology. Neither should the computing environment 500 be interpreted as having any dependency or requirement relating to any one or combination of components illustrated in the example computing system 500.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for determining a sustainability impact for available data center architectures, said computer-implemented method comprising:

accessing, by a computer, a data center;

evaluating, by the computer, functional parameters of the data center by quantifying an availability of a plurality of architectures using a plurality of techniques, each technique suitable for a given architecture; and combining, by the computer, the functional parameters to generate a quantified judgment, the quantified judgment comprising a sustainability impact determination of available architectures of the data center and a total cost of ownership.

2. The computer-implemented method of claim 1, further comprising adjusting, by the computer, the data center based upon said quantified judgment.

3. The computer-implemented method of claim 1, wherein accessing, by the computer, a data center comprises accessing the data center at time of design of the data center.

4. The computer-implemented method of claim 1, wherein accessing, by the computer, a data center comprises accessing the data center at time of operation of the data center.

5. The computer-implemented method of claim 1, wherein accessing, by the computer, a data center comprises accessing the data center at an end-of-life of the data center.

6. The computer-implemented method of claim 2, wherein adjusting, by the computer, the data center based on said quantified judgment comprises adjusting the data center according to a pre-determined policy.

7. The computer-implemented method of claim 2, wherein adjusting, by the computer, the data center based on a quantified judgment comprises adjusting the data center according to received adjustment instructions.

8. A computer system coupled with a quantification hardware module, said quantification hardware module comprising:
   a data center accessor to access a data center;
   a functional parameter evaluator to evaluate functional parameters of the data center by quantifying an availability of a plurality of architectures using a plurality of techniques, each technique suitable for a given architecture, and by determining a total cost of ownership of available architectures; and
   a functional parameter quantifier to generate a quantified judgment by combining the functional parameters, the quantified judgment comprising a sustainability impact determination of the available architectures of the data center.

9. The computer system of claim 8, further comprising a data center adjuster to adjust the data center based upon the quantified judgment.

10. The computer system of claim 8, wherein the plurality of techniques is selected from the following group of techniques: stochastic petri nets, reliability block diagrams, zone branch, event tree, Monte Carlo and discrete event simulation, cut set, path set, fault tree, and Markov model.

11. The computer system of claim 8, wherein the functional parameter evaluator comprises a sustainability determiner to determine a sustainability of the available architectures for the said data center.

12. The computer system of claim 11, wherein the sustainability determiner comprises one or more of impact determiners selected from: an energy consumption determiner; an exergy loss determiner; a carbon footprint determiner; and a toxicity impact determiner.

13. The computer system of claim 12, wherein one or more of the impact determiners are represented by a separate metric.

14. The computer system of claim 12, wherein the one or more of said impact determiners are combined to form a single quantifiable parameter.

15. A non-transitory computer readable storage medium comprising executable instructions to:
   access, by a computer, a data center;
   evaluate, by the computer, functional parameters of the data center by quantifying an availability of a plurality of architectures using a plurality of techniques, each technique suitable for a given architecture;
   combine, by the computer, the functional parameters to generate a quantified judgment, the quantified judgment comprising a sustainability impact determination of available architectures of the data center and a total cost of ownership.

16. The non-transitory computer readable storage medium of claim 15, comprising executable instructions to adjust, by the computer, the data center based upon the quantified judgment.

* * * * *